Feb. 14, 1928.
E. H. WALKER
1,658,871
FRICTION DRAFT GEAR
Filed Nov. 20, 1926   2 Sheets-Sheet 1
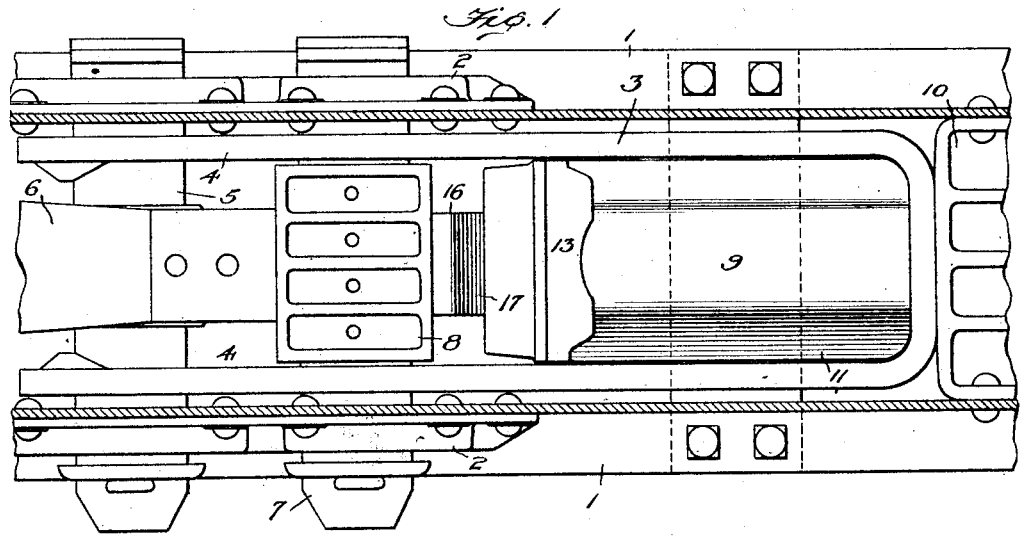
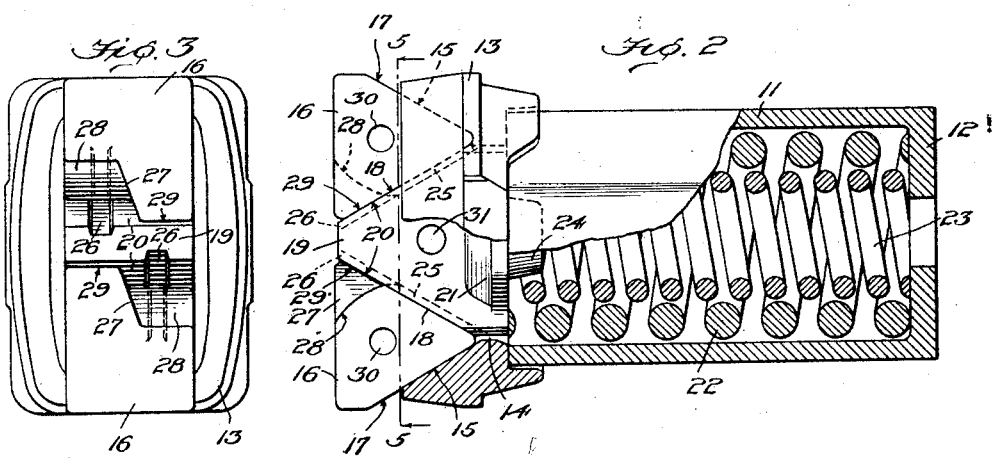
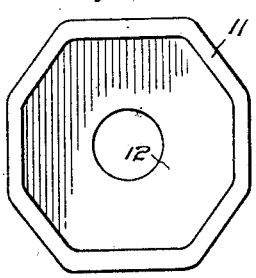
Inventor
Edward H. Walker
By John Milton Jester
Attorney

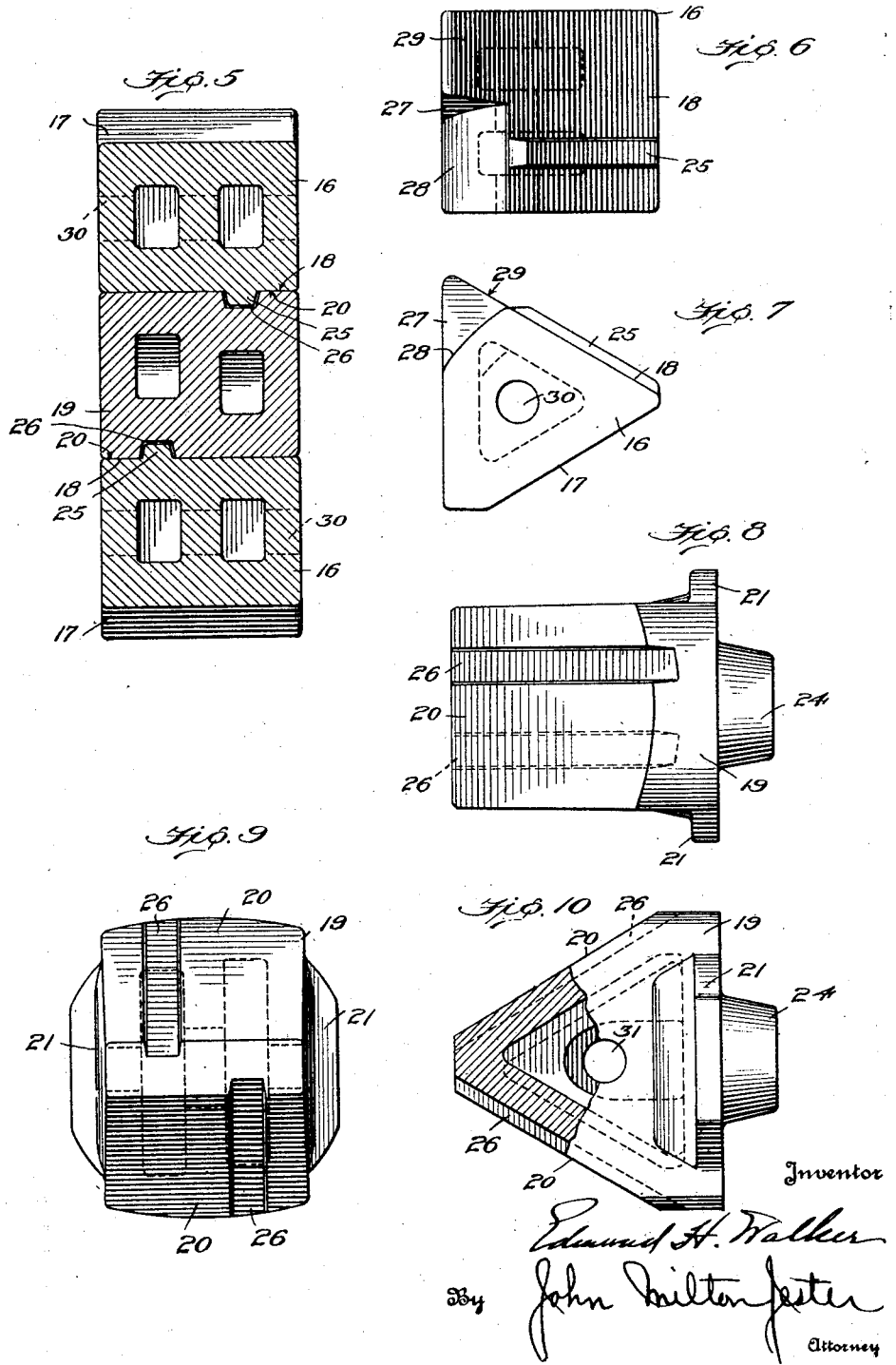

Patented Feb. 14, 1928.

1,658,871

UNITED STATES PATENT OFFICE.

EDMUND H. WALKER, OF NEW YORK, N. Y.

FRICTION DRAFT GEAR.

Application filed November 20, 1926. Serial No. 149,656.

The invention relates to friction draft gear for railway cars.

The principal object of the invention, generally stated, is to provide a friction draft gear embodying a plurality of contacting friction blocks or wedges having interfitting means thereon coacting to prevent incorrect assembly of the several elements with respect to the friction box and to one another.

An important object of the invention is to provide a friction draft gear in which the usual friction wedge blocks positioned in the friction box are, in addition to being designed to permit clearance upon full closure of the gear, also provided with means or cooperating portions so disposed as to interfit to serve as guide means for correct assembling while permitting the necessary frictional sliding movement.

Another object of the invention is to provide a friction draft gear in which the center wedge is provided with an integrally formed spring plate, the number of separate parts in the gear being consequently reduced and the possibility of any movement of the center wedge with respect to the spring plate being thereby avoided.

Yet another object is to provide a friction draft gear in which the center wedge which coacts with the wedge blocks engaging the friction box is provided at its opposite active faces with grooves slidably receiving ribs on the friction blocks, the grooves coacting with the ribs to facilitate correct assembly of the parts and also serving as means permitting the egress of chips, dirt or any other foreign matter which may work down and out of the gear instead of being pounded between and into the blocks as in ordinary constructions.

A still further object of the invention is to provide a friction draft gear in which the outer wedge blocks or those interposed between the center wedge and the friction box have their projecting end portions so formed as to permit slight rocking of the wedge blocks laterally of the gear to relieve an unusual pressure from the opposite side while maintaining the parts in proper position and against any possible displacement while preserving substantially the maximum friction areas.

A still further object of the invention is to provide a friction draft gear in which the various wedge or friction members are cored out to reduce the weight, the cores opening out to the sides and providing holes within which might be engaged a pry bar or the like in case such is necessary to effect loosening or extraction of any of the elements in the event of jamming.

An additional object of the invention is to provide a friction draft gear embodying the above mentioned features and being, moreover, simple and inexpensive to manufacture, easy to assemble, positive in action, efficient and durable in service, and a general improvement in the art.

To the attainment of the foregoing and other objects and advantages the invention preferably consists in the detailed construction and the arrangement and combination of parts to be hereinafter more fully described and claimed, and illustrated in the accompanying drawings in which:

Figure 1 is a plan view illustrating the friction drift gear positioned in a railway draft rigging, Figure 2 is a detached view of the friction draft gear, parts thereof being in elevation and a portion being shown in section, Figure 3 is a front elevation of the gear or an end view taken from the left hand side of Figure 2, Figure 4 is a detail end view of the spring barrel or casing viewing it from the open end, Figure 5 is a vertical cross sectional view taken on the line 5—5 of Figure 2 and looking in the direction of the arrows, Figure 6 is a plan view of one of the friction blocks detached, Figure 7 is a side elevation thereof, Figure 8 is a plan view of the combined center wedge and spring plate or follower, Figure 9 is a front elevation thereof, and Figure 10 is a side elevation, partly broken away and in section.

Referring more particularly to the drawings wherein similar reference characters designate corresponding parts in the several views, I have shown my invention applied to or embodied in a friction draft gear inserted within a railway draft rigging of the horizontal two-key Farlow type. The numeral 1 designates the center sills which are provided with cheek plates 2, the sills and cheek plates being suitably slotted to permit relative movements of the keys in the usual manner. Positioned between the sills is a horizontal yoke 3, the forward ends of the arms 4 of which are slotted to receive the key 5 which connects the coupler 6 with the yoke and which also extends into the forward alined slots in the sills and cheek plates. Another key 7 extends through the other set of slots in the sills and cheek plates and through corresponding slots in the yoke arms 4 and the follower block 8 interposed between the coupler butt and the friction device which is indicated as a whole by the numeral 9. A rear stop 10 is provided for cooperation with the rear of the yoke 3.

The draft gear or cushioning mechanism 9 includes a spring barrel or casing 11 which has one end 12 substantially closed and its other end open. Suitably engaged upon the open end is the friction box 13 which is here shown as of rectangular shape whereas the spring barrel or casing is disclosed as of octagonal shape. It should, however, be understood that these details of shape are immaterial. The friction box has the usual opening 14 therein and has outwardly inclined friction faces 15 formed therein.

Located within the friction box 13 and coacting with the inclined friction surfaces 15 thereof are outer friction blocks 16 which have smooth outer faces 17 contacting the surfaces 15 and which have oppositely inclined inner faces 18. Located between and coacting with the friction blocks 16 is the center wedge 19 which has its opposite faces 20 contacting conformingly with the faces 18. The rear end of the center wedge is enlarged, widened or formed with lateral extensions 21 and is so constructed or shaped as to define a spring plate for engagement against the forward end of the cushioning means located within the barrel or casing 11. The cushioning means is herein disclosed as including outer and inner helical springs 22 and 23 respectively and the rear face of the spring plate portion of the center wedge is preferably provided with a projection 24 engaging within the inner spring 23 and acting to center the same with respect to the spring barrel or casing. By this particular construction of the center wedge it is clear that the spring plate forms an integral part thereof instead of a separate element and as a consequence the number of necessary parts in the gear is reduced.

In order to insure correct assembly of the friction blocks 16 with respect to the center wedge 19, the former are disclosed as provided at their inclined faces 18 with ribs 25 received within corresponding grooves 26 in the faces 20 of the latter. It is preferable that the ribs 25 and corresponding grooves 26 receiving the same be located to one side of the center line and in staggered relation as clearly indicated in Figure 5 to avoid weakening the parts as would occur if the grooves in the center wedge were placed in alinement. It is, however, intended that the parts should correspond so that both friction blocks 16 will be of identical construction and interchangeable.

In order to permit slight lateral rocking of the wedge blocks 16 to relieve an undue strain from the opposite side, it is intended that the inner forward edges thereof be cut away or stepped as disclosed at 27, the surfaces 28 of the cut away portions being curved outwardly in opposite directions. The ribs 25 of course terminate at and have their ends merging into these curved surfaces. The uncutaway portions of the wedge blocks 16, which portions are indicated at 29, are smooth and bear against substantially one-half of the surfaces 20 of the center wedge block. The possible rocking movement is thus provided for while preserving substantially the maximum friction surface.

In order to reduce the weight of the parts the wedge blocks 16 and also the center wedge 19 are preferably cored out, there being openings 30 and 31 respectively, in the sides thereof through which it is conceivable that a pry bar or the like might be inserted for the purpose of loosening or extracting the parts in the event of a possible jam from some unforseen cause.

In the use and operation of a draft gear constructed in accordance with the present invention, it will be clear that incorrect assembly of the parts will be impossible for the reason that if any attempt is made to insert a friction block 16 in its reversed position, that is to say with the face 17 disposed against a surface 20 of the center wedge the wedge block will cant or tilt laterally so that it cannot be brought into proper position. The tilting under such circumstances is assured owing to the fact that the rib 25 is not located at the longitudinal center line but off to one side thereof. Either wedge block 16 may be used at the top or at the bottom as they are identical and consequently interchangeable, the grooves 26 in the center wedge being correspondingly located in the opposite faces thereof to receive the ribs 25. It is evident that assembly is bound to be correct even though made by the most unskilled workman. The device operates in substantially the same manner as others for the same purpose though it does have the additional feature of the cut away corners at the inner forward edges of the wedge blocks for the purpose of permitting the slight lateral rocking which may be necessary under some circumstances. It is really believed that the construction, operation and advantages will be readily apparent to one skilled in the art without further explanation.

While I have shown and described the preferred embodiment of the invention, it should be understood that I reserve the right to make such changes in the details of construction and the arrangement of parts as will not depart from the spirit of the invention or the scope of the claims hereunto appended.

Having thus described the invention, I claim:

1. A friction shock absorbing mechanism for railway draft rigging involving a spring barrel, a frction box positioned at one end of the barrel and having oppositely disposed inclined friction faces, a spring mounted within said barrel, friction wedge blocks havng surfaces cooperating with the friction box, each of said blocks having a projecting portion, and a center wedge having grooves coacting respectively with said projecting portions of the first mentioned wedge blocks and slidable with respect thereto, said projecting portions of the wedge blocks being off-center with respect to the longitudinal axis thereof and the coacting grooves of the center wedge being correspondingly off-center.

2. A friction shock absorbing mechanism for railway draft rigging involving a spring barrel, a friction box positioned at one end of the barrel and having oppositely disposed inclined friction faces, a spring mounted within said barrel, friction wedge blocks having surfaces cooperating with the friction box, each of said blocks having a projecting portion, and a center wedge having grooves coacting respectively with said projecting portions of the first mentioned wedge blocks, said projecting portions of the wedge blocks being off-center with respect to the longitudinal axis thereof and the coacting grooves of the center wedge being correspondingly off-center and staggered whereby the first named blocks will be interchangeable for use at either side of the center wedge.

3. A shock absorbing mechanism of the character described comprising a friction box having inclined friction faces, a cushioning element, a casing for the cushioning element engaging the friction box, a plurality of friction blocks having surfaces engaging the inclined friction faces of the friction box, a center wedge interposed between said friction blocks, and means arranged in staggered relation at opposite sides of the center wedge and at opposite sides of the longitudinal center line of the friction blocks interengaging to permit relative sliding movement and acting to prevent incorrect assembly.

4. In a friction draft gear, a spring barrel containing cushioning means, a friction box engaged upon the barrel and having inclined friction surfaces, outer friction blocks having inclined faces coacting with said surfaces and having their adjacent faces oppositely inclined and formed with longitudinal ribs, the ribs on the inner faces of said wedge blocks being located at opposite sides of the longitudinal center, and a center wedge coacting with the cushioning means and located between said friction blocks, the active faces of said center wedge being provided with grooves located at opposite sides of the longitudinal center and slidably receiving said ribs, said ribs acting to prevent incorrect assembly of the parts.

5. In a friction draft gear, a spring barrel containing cushioning means, a friction box at one end of the barrel having inclined friction surfaces, outer wedge blocks coacting with said inclined surfaces, and a center wedge coacting with said cushioning means and located between said wedge blocks for coaction therewith, the wedge block engaging faces of the center wedge being formed with longitudinally extending grooves extending from end to end thereof and the wedge blocks having ribs received within said grooves, the grooves being of greater depth than the height of the ribs to provide clearance between the bottom of the grooves and the ribs.

In testimony whereof I affix my signature.

EDMUND H. WALKER.